US006996417B2

(12) United States Patent  
Ono

(10) Patent No.: US 6,996,417 B2
(45) Date of Patent: Feb. 7, 2006

(54) RADIO TERMINAL, INFORMATION PROCESSING SYSTEM USING RADIO TERMINAL, AND EXTERNAL PROCESSING TERMINAL FOR ASSISTING RADIO TERMINAL

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 09/773,953

(22) Filed: Feb. 1, 2001

(65) Prior Publication Data

US 2001/0013062 A1 Aug. 9, 2001

(30) Foreign Application Priority Data

Feb. 3, 2000 (JP) .............................. 2000-025902

(51) Int. Cl.
*H04M 1/00* (2006.01)
*H04M 1/66* (2006.01)
(52) U.S. Cl. ................. 455/556.2; 455/414.2; 455/557; 455/410; 455/414.4
(58) Field of Classification Search ................ 455/410, 455/411, 550, 556.1, 556.2, 557, 558, 559, 455/344, 412.1, 414.1, 414.4, 414.2; 709/218, 709/219
See application file for complete search history.

(56) References Cited

U.S. PATENT DOCUMENTS

| | | | | |
|---|---|---|---|---|
| 5,412,721 A | * | 5/1995 | Rager et al. ................. 380/273 |
| 5,444,869 A | * | 8/1995 | Stricklin et al. ............ 455/90.2 |
| 5,920,826 A | * | 7/1999 | Metso et al. ................. 455/557 |
| 6,138,004 A | * | 10/2000 | McGregor et al. .......... 455/411 |
| 6,170,057 B1 | * | 1/2001 | Inoue et al. ................. 713/153 |
| 6,192,259 B1 | * | 2/2001 | Hayashi .................... 455/575.1 |
| 6,271,865 B1 | * | 8/2001 | Yu et al. ..................... 345/467 |
| 6,356,761 B1 | * | 3/2002 | Huttunen et al. ......... 455/456.1 |
| 6,370,374 B1 | * | 4/2002 | Eichinger et al. ........... 455/411 |
| 6,397,079 B1 | * | 5/2002 | Shimoda et al. ............ 455/557 |
| 6,434,405 B1 | * | 8/2002 | Sashihara ................... 455/557 |
| 6,529,743 B1 | * | 3/2003 | Thompson et al. .......... 455/557 |

FOREIGN PATENT DOCUMENTS

| | | |
|---|---|---|
| EP | 0 748 139 A2 | 12/1996 |
| GB | 2301987 | 12/1996 |
| JP | 10-200530 | 7/1998 |

(Continued)

OTHER PUBLICATIONS

Japanese Office Action issued on Oct. 29, 2002 (w/ English translation of relevant portions).

*Primary Examiner*—Duc M. Nguyen
(74) *Attorney, Agent, or Firm*—Dickstein, Shapiro, Morin & Oshinsky, LLP.

(57) ABSTRACT

A radio terminal includes a content acquisition section, content transfer section, content request section, content memory, and content reconstruction section. The content acquisition section acquires a content on the Internet by radio. The content transfer section transfers the content acquired by the content acquisition section to an external server. After transfer of the content, the content request section requests the external server to transmit content data converted in accordance with the content reconstruction capability of the device. The content memory stores converted content data received from the external server in response to a request from the content request section. The content reconstruction section reconstructs the content data stored in the content memory. An information processing system and external processing terminal are also disclosed.

9 Claims, 16 Drawing Sheets

FOREIGN PATENT DOCUMENTS

| | | |
|---|---|---|
| JP | 10-283357 | 10/1998 |
| JP | 10-285216 | 10/1998 |
| JP | 11-41643 | 2/1999 |
| JP | 11-146016 | 5/1999 |
| JP | 11-168425 | 6/1999 |
| WO | WO9840978 | 9/1998 |

* cited by examiner

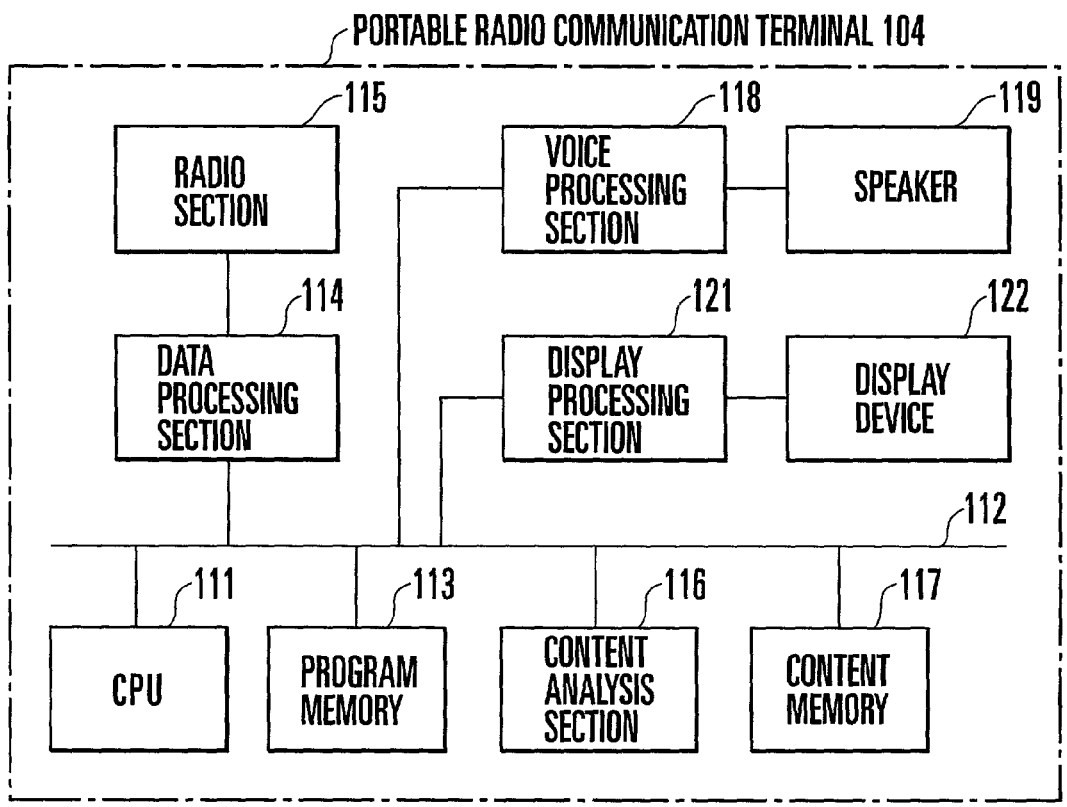
F I G. 15

RADIO TERMINAL, INFORMATION PROCESSING SYSTEM USING RADIO TERMINAL, AND EXTERNAL PROCESSING TERMINAL FOR ASSISTING RADIO TERMINAL

BACKGROUND OF THE INVENTION

The present invention relates to a radio terminal such as a portable radio communication terminal for acquiring contents on the Internet, an information processing system using the radio terminal, and an external processing terminal connected to the radio terminal to assist the radio terminal.

In recent years, the Internet becomes popular to allow taking advantage of many opportunities to acquire contents from a content server on the WWW (World Wide Web) to obtain various kinds of information or do shopping on the Internet. Such use of the Internet greatly increases along with the spread of portable terminals such as a PHS (Personal Handyphone System) or portable telephone.

As shown in FIG. 14, in an information processing system using a conventional portable terminal, a content server 102 and portable telephone network 103 are connected to the Internet 101. A portable radio communication terminal (to be referred to as a portable terminal hereinafter) 104 is connected to the portable telephone network 103. The content server 102 accommodates various contents written in a document description language such as an HTML (Hyper-Text Markup Language) or XML (Extensible Markup Language). The portable terminal 104 accesses the portable telephone network 103, thereby displaying these contents on its display device or outputting a voice as part of the contents of the contents.

As shown in FIG. 15, the portable terminal 104 comprises a CPU (Central Processing Unit) 111, and a program memory 113, data processing section 114, content analysis section 116, content memory 117, voice processing section 118, and display processing section 121 connected to the CPU 111 through a bus 112 such as a data bus. These components 113, 114, 116, 117, 118, and 121 are connected to the CPU 111 through the bus 112 such as a data bus. The portable terminal 104 also has a radio section 115 connected to the data processing section 114, a speaker 119 connected to the voice processing section 118, and a display device 122 connected to the display processing section 121.

The program memory 113 stores a program which is executed by the CPU 111 to implement various functions of the portable terminal 104. The data processing section 114 is connected to the portable telephone network 103 (FIG. 14) by radio to transmit/receive data. The content analysis section 116 analyzes the contents of contents received from the content server 102 (FIG. 15) through the data processing section 114. The content memory 117 stores necessaries of acquired contents. The voice processing section 118 processes voice data in acquired contents and outputs the voice data from the speaker 119. The display processing section 121 processes image data in acquired contents and displays the image data on the display device 122 such as a liquid crystal display device.

The block diagram of the portable terminal shown in FIG. 15 does not illustrate a known technique but is shown for the descriptive convenience.

Processing from a content request by the portable terminal of the above-described information processing system to image display will be described next with reference to FIG. 16. In acquiring a content, in accordance with operator's operation on the portable terminal 104, the CPU 111 of the portable terminal 104 requests, through the portable telephone network 103, the content server 102 on the network to acquire data related to the content (step S131). In response to this request, the content server 102 returns data related to the requested content to the portable terminal 104 (step S132).

The CPU 111 sends requests for data acquisition a plurality of number of times depending on the content (step S133). The content server 102 returns data related to the requested content to the portable terminal 104 in response to each request (step S134). The CPU 111 sequentially stores the returned data in the content memory 117.

When all data related to the requested content are completely received, the content analysis section 116 analyzes the content stored in the content memory 117. On the basis of the analysis result, the CPU 111 requests the display processing section 121 to execute display processing for data to be displayed on the display device 122 (step S135). Thus, the content is displayed on the display device 122.

A portable terminal such as a portable telephone must be compact and lightweight for portability. For this reason, as compared to a normal desktop computer, the capacity of the internal memory, the processing speed of the CPU 111, or the screen size of the display device 122 is considerably limited.

Japanese Patent Laid-Open No. 11-168425 has proposed to reduce the capacity of a memory to be used by replacing tag information contained in the document description language with simple compressed information. In this proposal, a database related to tag information is prepared in a portable terminal to compress/decompress tag information.

However, contents are increasingly becoming complex and large as various media are developed. For this reason, it is difficult to update the database itself, which is related to tag information. In addition, a memory capacity larger than the capacity that can be saved by compressing tag information is required to store contents. However, it is not practical to improve the capability of the portable terminal to meet the requirement because the terminal itself becomes bulky and expensive.

Contents are becoming more complex along with the sophistication of requests for contents. Hence, even when a portable terminal has a sufficient capability at certain time, it is often difficult to reconstruct a state-of-the-art content after the elapse of years from the purchase time.

Dedicated contents are created for such portable terminals with a less capability than a normal computer. However, when contents for portable terminals are created and provided aiming at a low-end portable terminal of various kinds of portable terminals, a portable terminal having a relatively high capability cannot take advantage of advanced contents. It is also difficult for the content provider side to create many types of contents according to the capabilities of individual portable terminals.

Furthermore, a portable terminal is poor in security as compared to a normal computer such as a desktop computer. This will be described in accordance with comparison between a normal computer and a portable terminal.

A conventional information processing system using the Internet will be described next with reference to FIG. 17. Computers $202_1$ to $202_A$ and a plurality of WTA (Wireless Telephony Application) servers $203_1$ to $203_B$ of conventional type are connected to the Internet 201 through a router (not shown). Gateways $205_1$ to $205_D$ are connected to the Internet 201. Portable terminals $207_1$ to $207_F$ are connected to the gateways $205_1$ to $205_D$ through base stations $206_1$ to $206_E$. Each of symbols A to F represents an arbitrary positive value of 2 or more.

In this information processing system, assume that the first computer $202_1$ accesses a content as data stored in the first WTA server $203_1$. In this case, the first computer $202_1$ designates the URL (Uniform Resource Locator) of the content to be accessed. Communication for browsing the content on the WWW is performed using a communication protocol called the HTTP (HyperText Transfer Protocol). More specifically, the first computer $202_1$ transmits the URL of the HTML document to be displayed as a request. In response to this, the first WTA server $203_1$ transmits the corresponding HTML document to the first computer $202_1$ as a client. In this communication protocol, the computer is connected to the first WTA server $203_1$ every time communication data is to be acquired, and disconnected when reception of communication data is ended.

A case wherein the first portable terminal $207_1$ in the portable terminals $207_1$ to $207_F$ accesses the first WTA server $203_1$ will be described next. In this case, a communication protocol called the HTTP is used between the first WTA server $203_1$ and the first gateway $205_1$ connected to the first portable terminal $207_1$, like the case wherein the computers $202_1$ to $202_A$ access the WTA server $203_1$ to $203_B$ of conventional type. In the WAP (Wireless Application Protocol), a protocol called the WSP (Wireless Session Protocol) is used between the second gateway $205_2$ and the second portable terminal $207_2$.

The WAP is a protocol for obtaining Internet information from a portable terminal using a telephone network. In this case, information is obtained from the WWW using the WML (Wireless Markup Language) similar to the HTML.

FIG. 18 shows communication between a computer and a WTA server of conventional type in the above-described information processing system. The computer 202 and WTA server 203 communicates various kinds of data such as data written in the description language HTML or GIF (Graphics Interchange Format) or BMP (BitMaP) data using the HTTP.

FIG. 19 shows communication between a portable terminal and a WTA server of conventional type. Communication using the HTTP is performed between the WTA server 203 and the gateway 205, as in FIG. 18. On the other hand, a communication method different from that in FIG. 18 is used between the portable terminal 207 and the gateway 205, considering that the capacity of the internal memory of the portable terminal 207 is small, or no high-speed CPU can be mounted for power saving or space saving. The WAP described above has received a great deal of attention as a communication method in this section.

In the WAP, a description language called the HTML sent from the WTA server 203 is sent to the gateway 205, where the display position of an image by GIF data or the like is calculated. The data is converted into data that can be actually displayed on two windows of the portable terminal 207 and sent to the portable terminal 207 as binary data. This transfer is done using a protocol called the WSP (Wireless Session Protocol).

To transmit information using a network, the security of communication must be taken into consideration. Between the computer 202 and WTA server 203 shown in FIG. 18, the SSL (Secure Socket Layer) or TLS (Transport Layer Security) is used for encryption or authentication, thereby ensuring the security of communication. The SSL is a protocol for implementing encryption and authentication function at socket level. The TLS is a security protocol that is replacing the SSL. These protocols almost equal and sometimes expressed as TLS/SSL. This expression will be used in the following description.

The TLS/SSL is also used between the computer 202 and the WTA server 203 shown in FIG. 19. Between the portable terminal 207 and the gateway 205, a protocol called the WTLS (Wireless Transport Layer Security) is used. This protocol has the same function as that of the TLS as the Internet standard and is optimized for the portable terminal 207. This protocol also has the encryption, authentication, and compression functions.

When the above-described encryption technique is employed, the security of communication data is ensured between the computer 202 and the WTA server 203 shown in FIG. 18. Like the computer 202 and WTA server 203 shown in FIG. 18, the gateway 205 and WTA server 203, and the gateway 205 and portable terminal 207 also ensure the security of communication therebetween. However, in the latter information processing system, encrypted communication data is temporarily decrypted by the gateway 205 and then encrypted using another protocol. Hence, the presence of the gateway 205 as the relay point between two points of data transmission is a blind spot in ensuring the security of communication.

Two problems are posed in ensuring the security of communication at the gateway 205. As the first problem, the gateway 205 may be attacked by a third party to alter or thieve communication data transmitted between the WTA server 203 and the portable terminal 207. As the second problem, the manager of the gateway 205 may see or alter communication data that is not secured in communication.

Various proposals have been made to solve the former problem. For example, invasion of a malicious third party is prevented using a fire wall, as described in Japanese Patent Laid-Open Nos. 10-200530, 10-285216, and 11-146016. However, this countermeasure is not perfect because communication data can be transmitted while detouring the network by tunneling processing. For the latter problem, since encrypted communication data is decrypted by the gateway 205 for the next encryption, one must presently expect morals of the manager of the gateway 205.

As described above, the security of end-to-end communication cannot be ensured between the portable terminal and the server on the network because the natures of the transmission paths therebetween are different up to the gateway between the paths.

A portable terminal and an information processing system using the portable terminal have been described above. A portable terminal having a relatively low processing capability also has the same problems as described above.

SUMMARY OF THE INVENTION

It is an object of the present invention to provide a radio terminal, information processing system, and external processing terminal, which are capable of ensuring the security of communication.

It is another object of the present invention to provide a radio terminal, information processing system, and external processing terminal, which are capable of acquiring and reconstructing a content freely created by a content creator side in accordance with their capabilities.

In order to achieve the above objects, according to the present invention, there is provided a radio terminal comprising content acquisition means for acquiring a content on the Internet by radio, content transfer means for transferring the content acquired by the content acquisition means to an external server, content request means for, after transfer of the content, requesting the external server to transmit content data converted in accordance with a content reconstruction capability of a self device, content storage means for storing converted content data received from the external server in response to a request from the content request means, and content reconstruction means for reconstructing the content data stored in the content storage means.

BRIEF DESCRIPTION OF THE DRAWINGS

FIG. 15 is a block diagram of the portable terminal shown in FIG. 14;

DESCRIPTION OF THE PREFERRED EMBODIMENTS

The present invention will be described below in detail with reference to the accompanying drawings.

Figure 1:
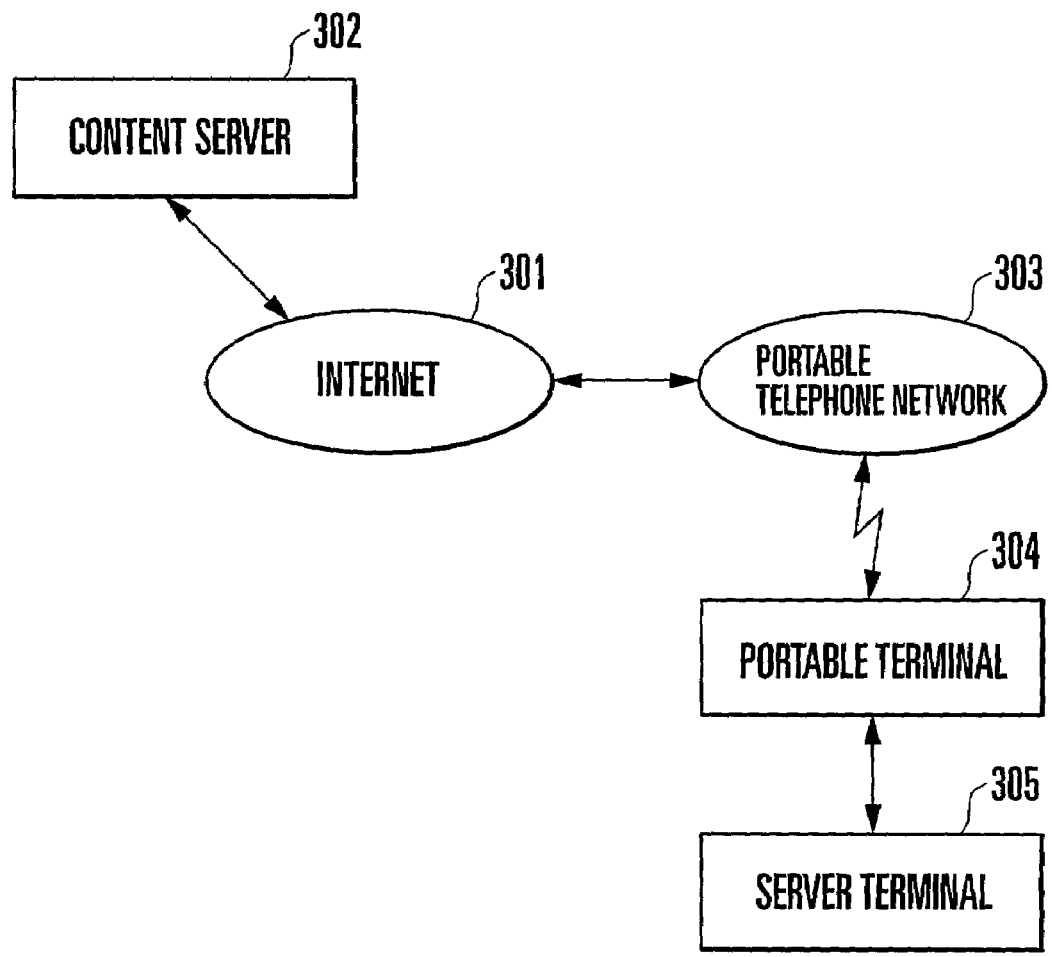
FIG. 1 is a view showing the outline of an information processing system according to an embodiment of the present invention.

FIG. 1 shows the outline of an information processing system according to the first embodiment of the present invention. Referring to FIG. 1, a content server 302 and portable telephone network 303 are connected to the Internet 301. A portable radio communication terminal (to be referred to as a portable terminal hereinafter) 304 is connected to the portable telephone network 303. An external server terminal 305 for executing local processing is connected to the portable terminal 304. The content server 302 accommodates various contents written in a document description language such as an HTML or XML.

The portable terminal 304 accesses the portable telephone network 303 to temporarily store, in the external server terminal 305, a content accommodated in the content server 302. The portable terminal 304 receives the stored content supplied from the external server terminal 305 and displays the contents of the content on the display device or outputs a voice as part of the contents of the content. The portable telephone network 303 functions as a communication network for connecting the portable terminal 304. Hence, the portable telephone network 303 itself does not execute special processing or data processing for a content.

FIG. 1 shows only one portable terminal 304 for the illustrative convenience, though a plurality of portable terminals 304 are normally connected to the portable telephone network 303. In addition, although one content server 302 and one portable telephone network 303 are connected to the Internet 301, a plurality of content servers and a plurality of portable telephone networks may be connected. Computers (not shown) are certainly connected to the Internet 301. In this embodiment, only one external server terminal 305 is shown for the illustrative convenience. However, a plurality of external server terminals 305 may be connected in correspondence with a plurality of portable terminals. An integrated external server terminal for individually coping with portable terminals may be present. An important point is that the portable terminal 304 and external server terminal 305 are arranged in a one-to-one correspondence in terms of function.

Figure 2:
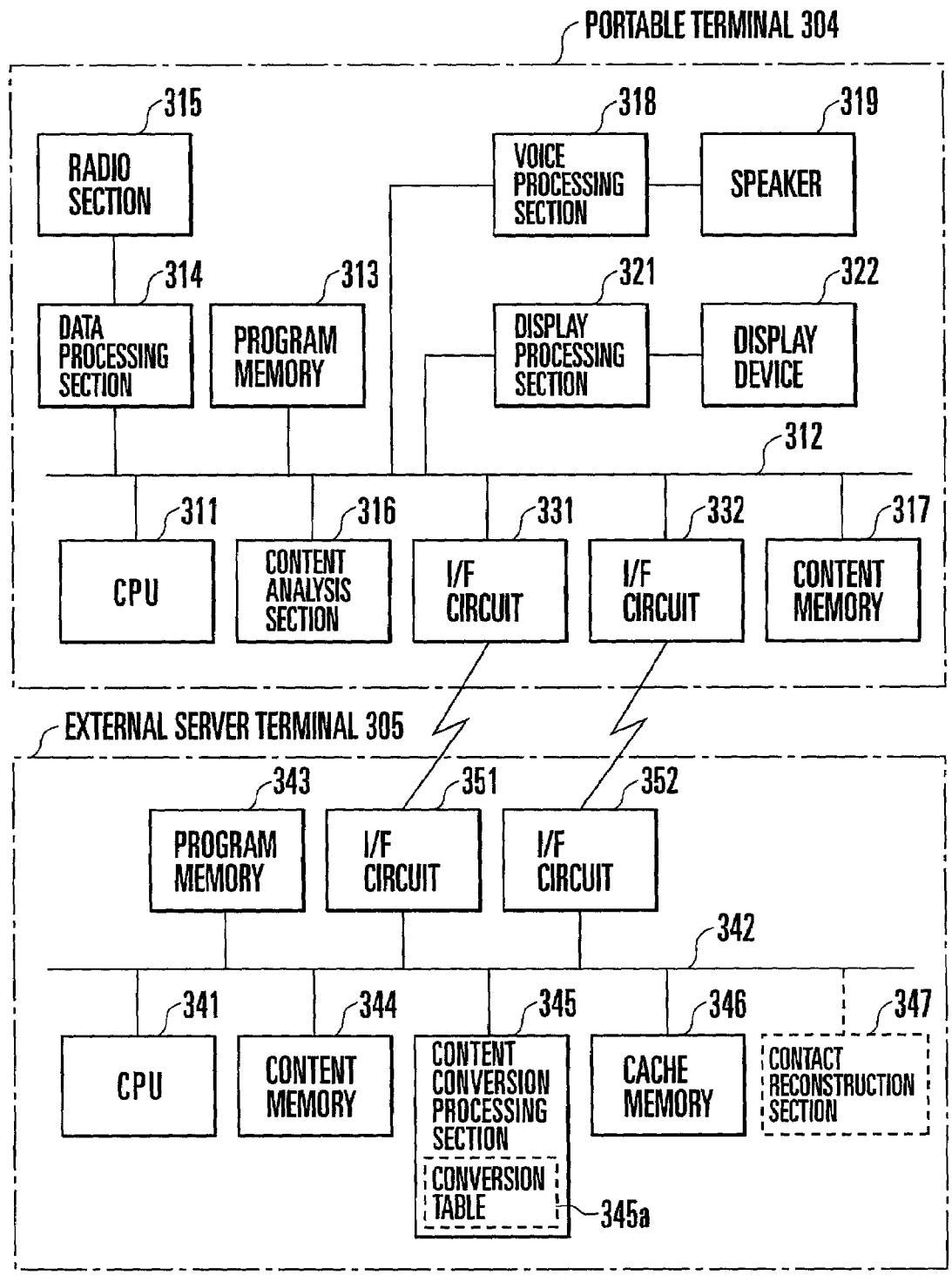
FIG. 2 is a block diagram of a portable terminal and external server terminal shown in FIG. 1.

As shown in FIG. 2, the portable terminal 304 comprises a CPU 311, program memory 313, data processing section 314, content analysis section 316, content memory 317, voice processing section 318, display processing section 321, and communication interface (I/F) circuits 331 and 332. These components 313, 314, 316, 317, 318, 321, 331, and 332 are connected to the CPU 311 through a bus 312 such as a data bus. The portable terminal 304 also has a radio section 315 connected to the data processing section 314, a speaker 319 connected to the voice processing section 318, and a display device 322 connected to the display processing section 321.

The program memory 313 stores a program which is executed by the CPU 311 to implement various functions of the portable terminal 304. The data processing section 314 is connected to the portable telephone network 303 (FIG. 1) by communication protocol processing in a radio section, i.e., by radio to perform speech communication with another portable terminal or data transmission/reception to/from the Internet 301 (FIG. 1).

The content analysis section 316 analyzes the contents of a content on the basis of the HTML of the content, which is received by the content server 302 (FIG. 1) through the data processing section 314. The content memory 317 receives, out of contents stored the external server terminal 305, a content necessary for reconstruction processing at the current time from the external server terminal 305, and temporarily stores the content.

A content acquired by the external server terminal 305 may be stored in the content memory 317 without any change in its contents. However, for a content having contents beyond the display or reconstruction capability of the portable terminal 304, its contents are converted by the external server terminal 305, and the converted content is supplied to the portable terminal 304. This copes with even contents beyond the limited processing capability of the portable terminal 304, including high-resolution image data or moving image data, HTML style sheet, and SMIL (Synchronized Multimedia Integration Language).

The external server terminal 305 is a portable computer assuming that the user of the portable terminal 304 carries the external server terminal 305 together with the portable terminal 304, or an information processing terminal of the same type. The external server terminal 305 may be a server for storing contents, which is prepared in an office or at home and shared by a plurality of persons. Radio communication is performed between the portable terminal 304 and the external server terminal 305. Instead, data transmission/reception may be performed using a dedicated communication cable, or infrared communication may be performed.

Requirements for a computer or information processing terminal as the external server terminal 305 are that it has a memory with a relatively large capacity, which can store various contents on the Internet and that it has a data conversion section which stores programs such as various plug-ins for reconstructing various contents. That is, this embodiment assumes that the capacity of the memory of the portable terminal 304 is relatively small. For such a portable terminal 304, the external server terminal 305 provides a space for storing contents with relatively large data amounts. If the portable terminal 304 has an insufficient content reconstruction capability because of its functional problem, the external server terminal 305 converts the data of contents, thereby consequently increasing the reconstruction capability for the contents.

The voice processing section 318 processes voice data of a content acquired by the external server terminal 305 and outputs the voice data from the speaker 319. The display processing section 321 processes image data of an acquired content and displays the image data on the display device 322 such as a liquid crystal display device. The portable terminal 304 has the interface (I/F) circuits 331 and 332 for communicating with the external server terminal 305.

As already described above, the external server terminal 305 is constituted as a computer or information processing terminal and uses a commercially available normal notebook computer. The external server terminal 305 comprises a CPU 341, program memory 343, content memory 344, content conversion processing section 345, cache memory 346, and communication interface (I/F) circuits 351 and 352. These components 343, 344, 345, 351, and 352 are connected to the CPU 341 through a bus 342 such as a data bus.

The program memory 343 stores programs which are executed by the CPU 341 to implement various functions of the external server terminal 305. The content memory 344 stores a content acquired from the content server 302 (FIG. 1) through the portable terminal 304. Such a content memory 344 is often formed from a storage medium such as a magnetic disk or optical disk. The cache memory 346 stores a converted content.

The content conversion processing section 345 converts a content stored in the content memory 344 into contents corresponding to the portable terminal 304. The interface circuits 351 and 352 perform radio communication with the interface circuits 331 and 332 of the portable terminal 304. The interface circuits 331 and 351 are used to perform communication necessary when the external server terminal 305 will acquire a content from the content server 302. The interface circuits 332 and 352 are used to perform communication when the portable terminal 304 will acquire a content from the external server terminal 305.

Note that the external server terminal 305 may have a contact reconstruction section 347 for displaying or outputting, as voice data, a content transferred from the portable terminal 304. In this case, an original content before conversion can be reconstructed not only on the portable terminal 304 side but also on the external server terminal 305 side.

Processing by the portable terminal in the information processing system having the above arrangement will be described next with reference to FIG. 3. First, the CPU 311 of the portable terminal 304 monitors generation of a content acquisition request (step S401). For example, when the operator of the portable terminal 304 inputs a desired URL to connect the portable terminal to the Internet and instructs acquisition of the content, a content acquisition request is generated. Similarly, when one of URLs registered in advance or displayed on the display device 322 is designated, a content acquisition request is generated.

In this case, the CPU 311 transfers the URL to the external server terminal 305 through the interface circuit 331 to request the external server terminal 305 to acquire the content (step S402). After this, the external server terminal 305 is monitored until notification representing completion of content acquisition is received from the external server terminal 305 (steps S403 and S404).

When the CPU 341 of the external server terminal 305 requests the content server 302 to acquire the content, the content server 302 acquires the contents of the content described in the HTML through the Internet 301, portable telephone network 303, and portable terminal 304 and stores the contents in the content memory 344. The CPU 341 analyzes the contents of the content stored in the content memory 344 and sequentially requests the content server 302 to send the files of various image and voice data that form the requested URL.

In transferring the contents of the content described in the HTML to the external server terminal 305, the CPU 311 of the portable terminal 304 analyzes the outline of the content and subsequently monitors communication between the content server 302 and the external server terminal 305 on the basis of the analysis result. The content itself, which is sent from the content server 302, is transferred to the external server terminal 305 using the interface circuit 331.

When the content is completely transferred by communication between the content server 302 and the external server terminal 305 through the portable terminal 304, a transfer completion notification is sent from the external server terminal 305 to the portable terminal 304. When the CPU 311 of the portable terminal 304 detects the transfer completion notification from the external server terminal 305 in step S403, the portable terminal 304 starts receiving the content converted for the portable terminal 304 from the external server terminal 305.

In this case, the content conversion processing section 345 of the external server terminal 305 selects a conversion table 345a on the basis of data of model names received from the portable terminal 304 in advance, thereby creating a converted content. In this embodiment, the request for converting the content into content data corresponding to the content reconstruction capability of the portable terminal 304 and transmitting the converted content is sent together with the content acquisition request from the portable terminal 304 to the external server terminal 305 in step S402. The content data conversion and transmission request may be separately transmitted from the portable terminal 304 to the external server terminal 305 after the acquisition completion notification in step S403.

The CPU 341 of the portable terminal 304 stores the converted content in the content memory 317 until reception of the converted content is ended (steps S405 and S406). When the converted content related to the content of the requested URL is completely stored in the content memory 317 (YES in step S405), the CPU 341 sends the stored converted content to the display processing section 321 and voice processing section 318 to make them execute reconstruction processing for corresponding contents (step S407). That is, the display device 322 visually displays image data, and the speaker 319 outputs voice data.

The content memory 317 is a memory for temporarily storing the content necessary for reconstruction of the content at the current time. Hence, if the memory becomes full of converted contents subsequently sent from the external server terminal 305, the data are sequentially cleared in the chronological order.

Figure 3:
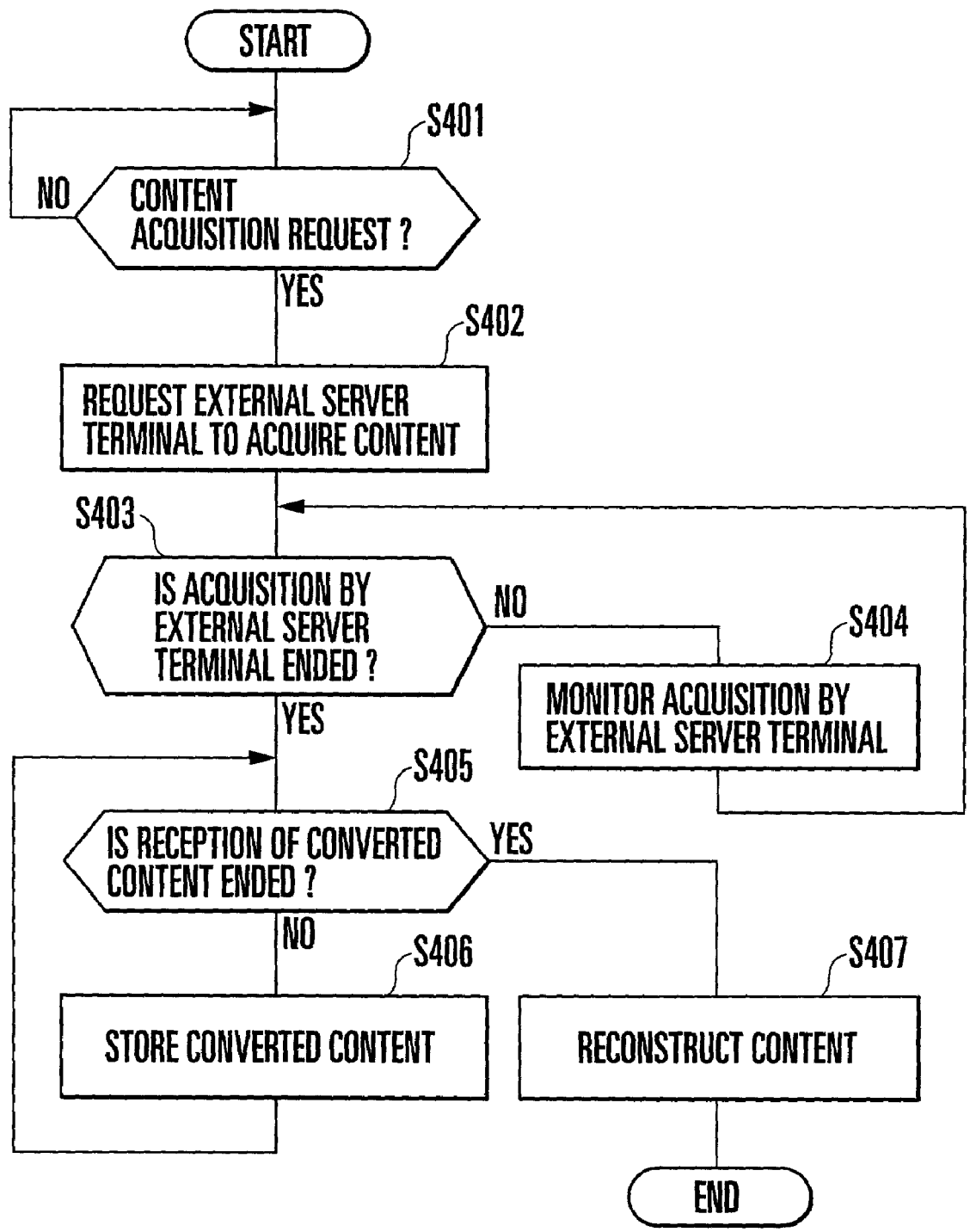
FIG. 3 is a flow chart showing processing by the portable terminal shown in FIGS. 1 and 2.
Figure 4:
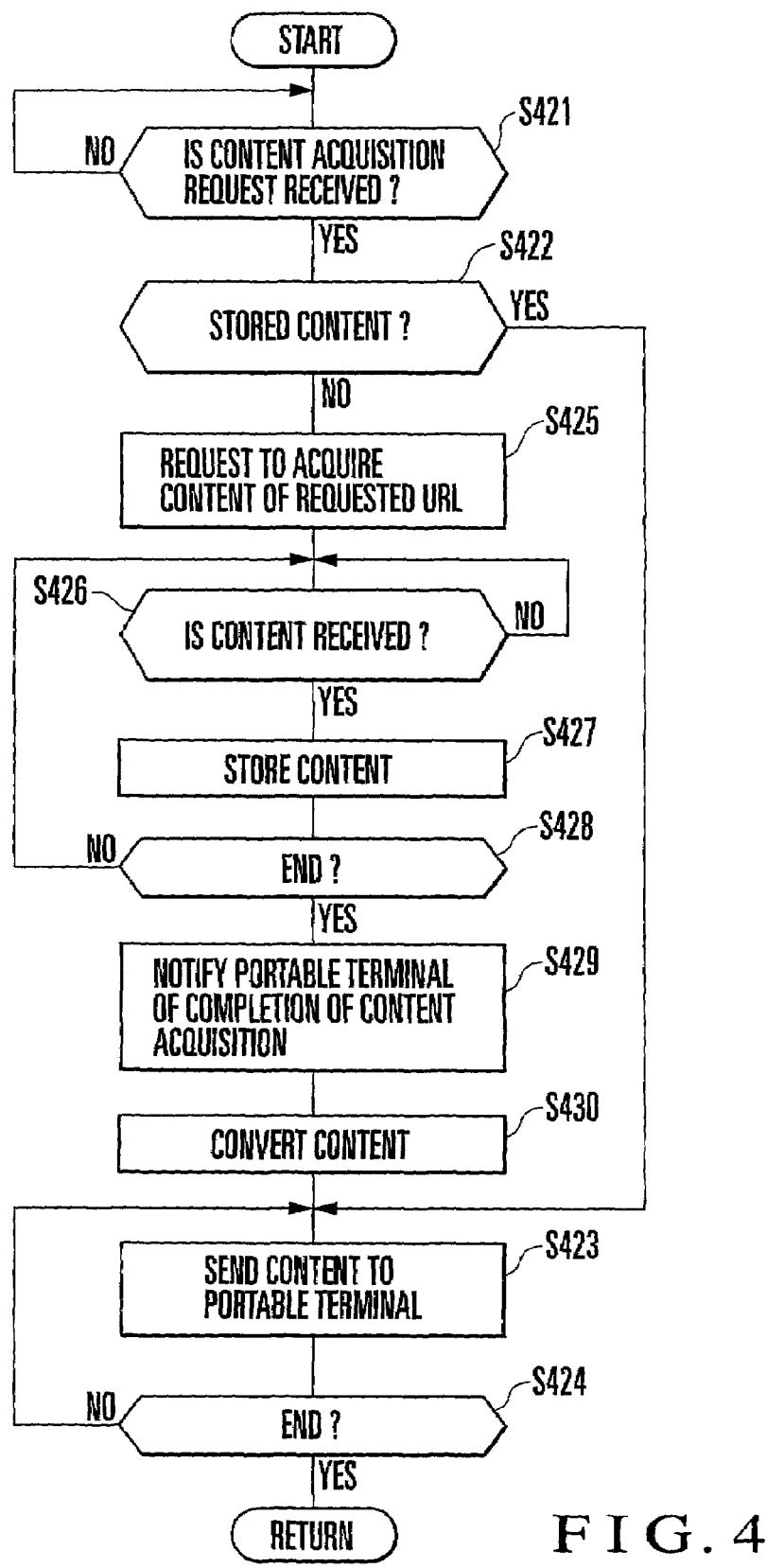
FIG. 4 is a flow chart showing processing by the external server terminal when the processing shown in FIG. 3 is executed by the portable terminal.

Processing by the external server terminal 305 when the processing shown in FIG. 3 is executed on the portable terminal side will be described next with reference to FIG. 4. The CPU 341 of the external server terminal 305 monitors a content acquisition request through the interface circuit 351 (step S421). Upon receiving a content acquisition request, the CPU 341 searches the content memory 344 to check whether the content is already stored (step S422). This is for the purpose of omitting any access to the content server 302 when a content which is the same as that acquired recently and probably has the same contents is requested again. Even in this case, an access can be done by presetting.

If YES in step S422, the interface circuit 352 instructs the interface circuit 332 of the portable terminal 304 to send the converted content (step S423). When content sending processing is ended (YES in step S424), the external server terminal 305 is set in the standby state again.

If NO in step S422, the interface circuit 351 accesses the Internet 301 through the interface circuit 331 of the portable terminal 304 and the portable telephone network 303. Next, the CPU 311 of the portable terminal 304 requests the content server 302 to acquire the contents of the requested URL (step S425).

Upon receiving the contents of the content from the content server 302 through the portable terminal 304 (YES in step S426), the CPU 341 of the external server terminal 305 sequentially stores the contents of the received content in the content memory 344 (step S427). When the desired content is completely stored in the content memory 344 by repeating individual data requests by the portable terminal 304 based on analysis of the content and the transmission operation by the content server 302 (YES in step S428), the external server terminal 305 notifies the portable terminal 304 that the content is completely stored (step S429).

Next, the content conversion processing section 345 of the external server terminal 305 converts the content currently stored in the content memory 344, in accordance with the reconstruction capability of the portable terminal 304 using the conversion table 345a (step S430), and stores the converted content in the cache memory 346. Instead of using the cache memory 346, both the content before conversion and the converted content may be stored in the content memory 344.

When conversion processing in step S430 is ended, the CPU 341 of the external server terminal 305 transmits the converted content to the portable terminal 304 in one or a plurality of cycles (step S423). The transmitted converted content is stored in the content memory 317. When the converted content is completely sent to the portable terminal 304 (YES in step S424), processing by the external server terminal 305 is ended.

When data itself has a data amount too large for the content memory 317, as in music data or video signal data, the data is divisionally transmitted to the portable terminal 304 side in accordance with a request from the portable terminal 304 or monitoring by the external server terminal 305.

Figure 5:
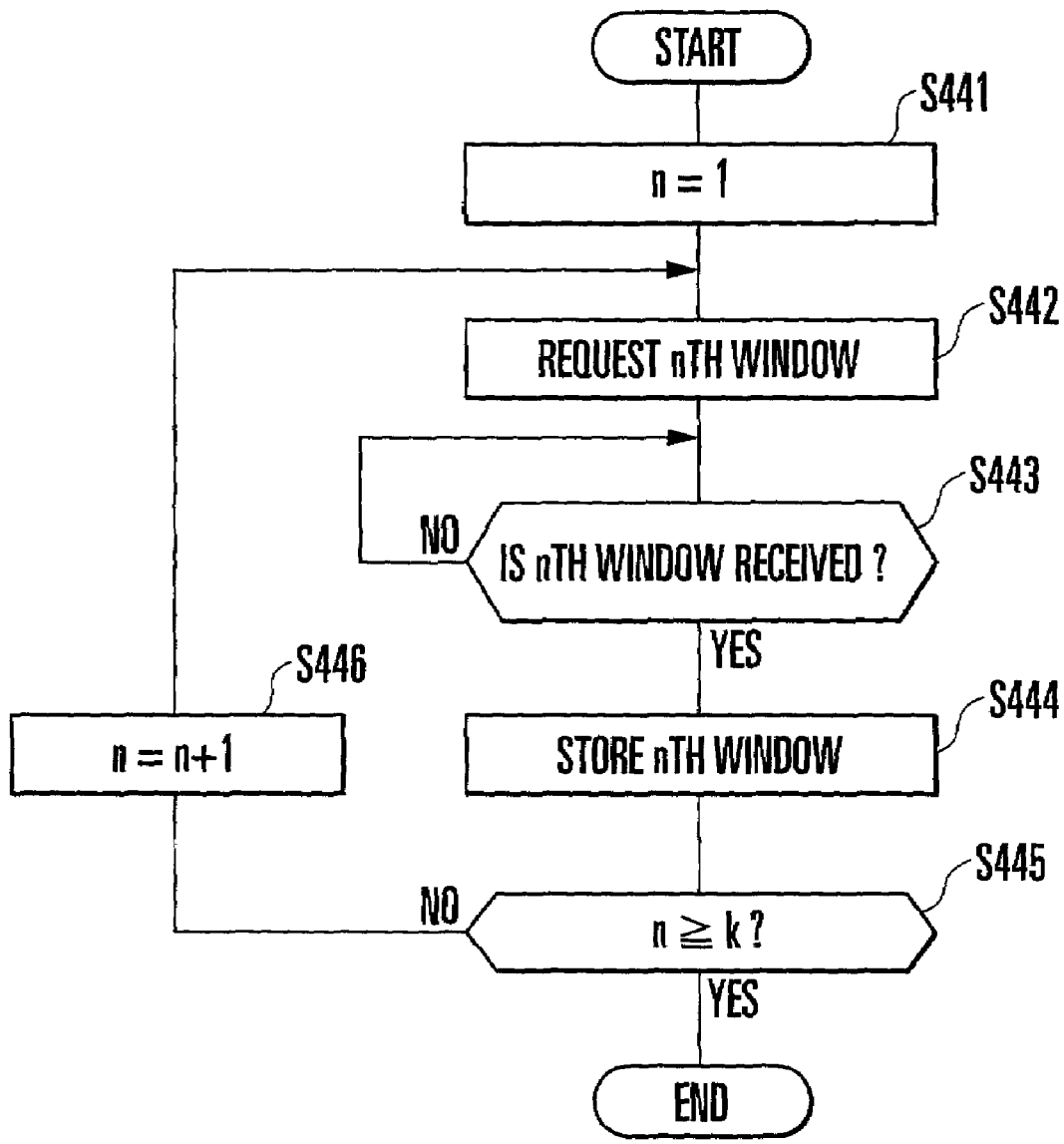
FIG. 5 is a flow chart showing processing by the portable terminal in receiving and reconstructing a moving image in a format that does not directly support reconstruction.

Processing by the portable terminal in receiving and reconstructing a moving image in a format that does not directly support reconstruction will be described next with reference to FIG. 5. Upon recognizing that moving image data is received by the external server terminal 305, the CPU 311 of the portable terminal 304 causes the content memory 344 to sequentially serially store the images of the respective frames. When reception of the moving image data is ended, the portable terminal 304 is notified of a total number k of frames by a content acquisition completion notification (step S429) from the external server terminal 305.

Next, in reconstructing the moving image, the CPU 311 initializes a parameter n to "1" (step S441) and requests the external server terminal 305 to send image data of nth, i.e., first window (step S442). The CPU 311 of the portable terminal 304 receives the data of the nth window sent from the external server terminal 305 in response to that request (step S443) and stores the data of the received window in the content memory 317 (step S444). Simultaneously, the received window data is sent to the display processing section 321 to display the image of the nth window, i.e., the first window.

After the window data is stored in the content memory 317, the CPU 311 of the portable terminal 304 checks whether the parameter n reaches the total number k of frames (step S445). Before the parameter n reaches the total number k of frames, the parameter n is incremented by "1" (step S446), and the external server terminal 305 is requested to send the image of the subsequent window in step S442. In a similar way, the moving image is displayed on the display device 322 as a result of the window request repeated, e.g., every ⅟30 sec.

When the number of times of image transfer (parameter n) finally reaches the total number k of frames (YES in step S445), transmission of the series of moving image data from the external server terminal 305 is ended. In this way, by repeating image data transmission processing and display processing in units of windows, even an image in an unsupported moving image format can be reconstructed.

Figure 17:
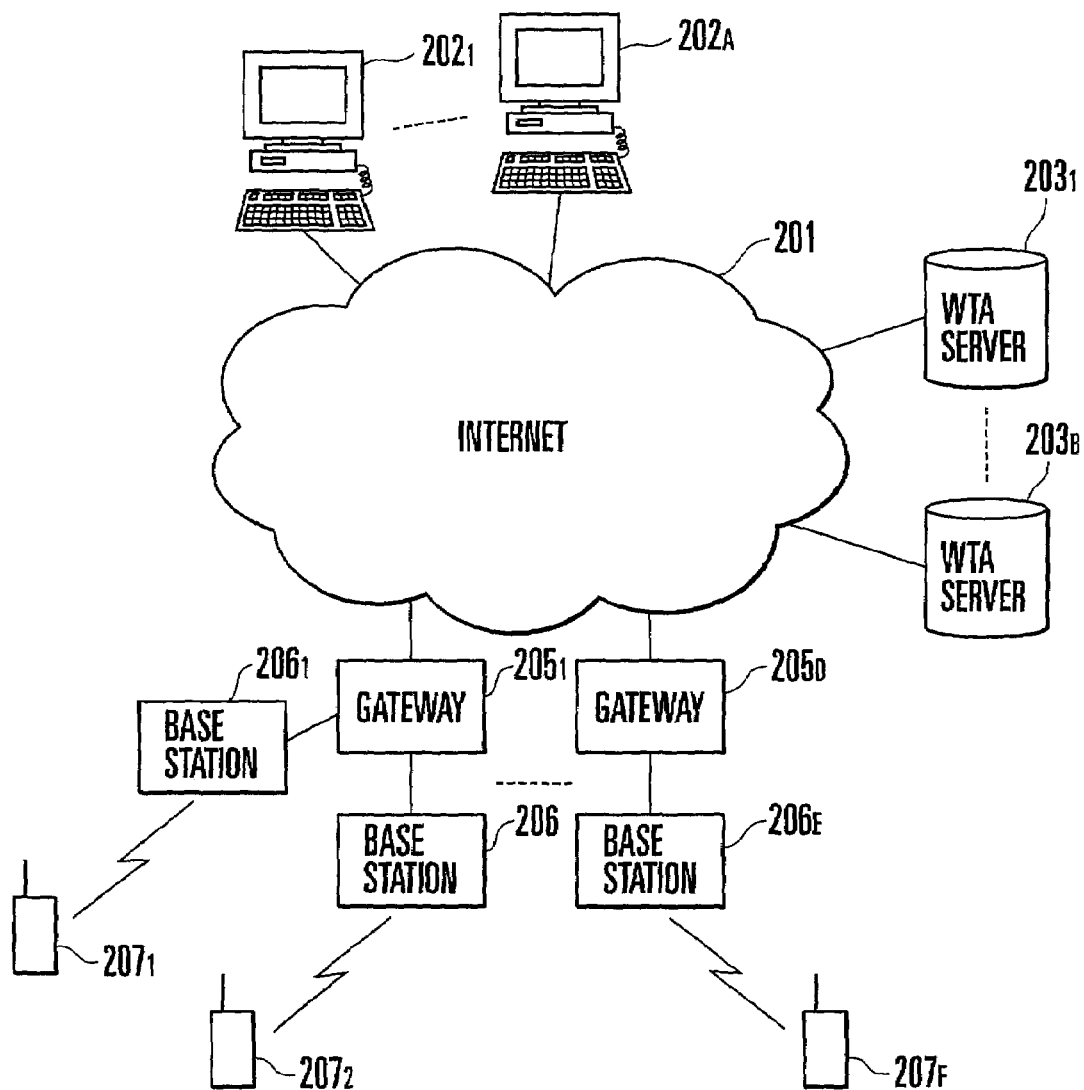
FIG. 17 is a view showing the outline of a conventional information processing system using the Internet.
Figure 18:
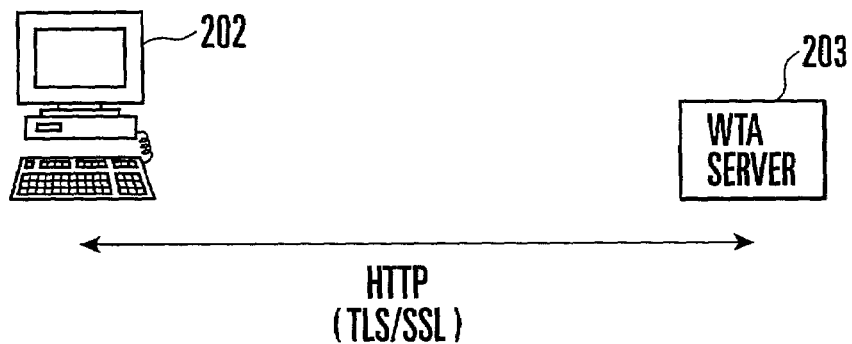
FIG. 18 is a view for explaining the communication form between a computer and an HTTP server.
Figure 19:
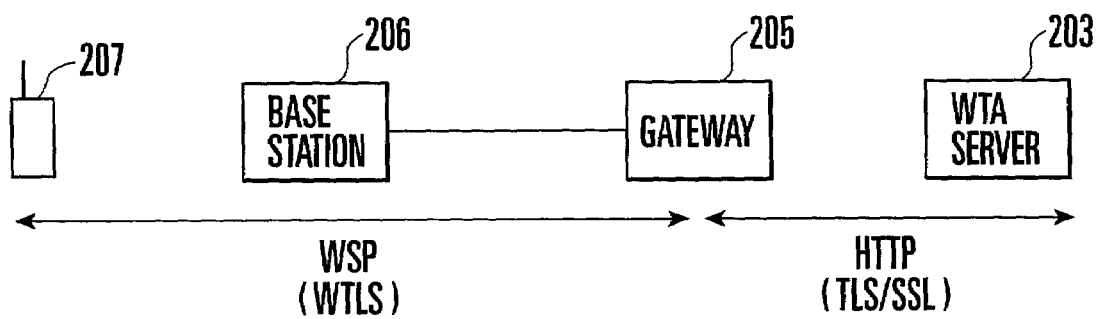
FIG. 19 is a view for explaining the communication form between a portable terminal and a WTA server of conventional type.

As described above, in the above embodiment, the gateways 205$_1$ to 205$_D$ shown in FIG. 17 are not present between the content server 302 and the portable terminal 304. Hence, the problem of security caused by the gateways 205$_1$ to 205$_D$ mentioned as the prior art is not posed. Since the portable terminal 304 and external server terminal 305 have a private connection relationship on the portable terminal 304 side, the problem of security does not occur, either. As can be understood, the information processing system of this embodiment is excellent in security.

Figure 6A:
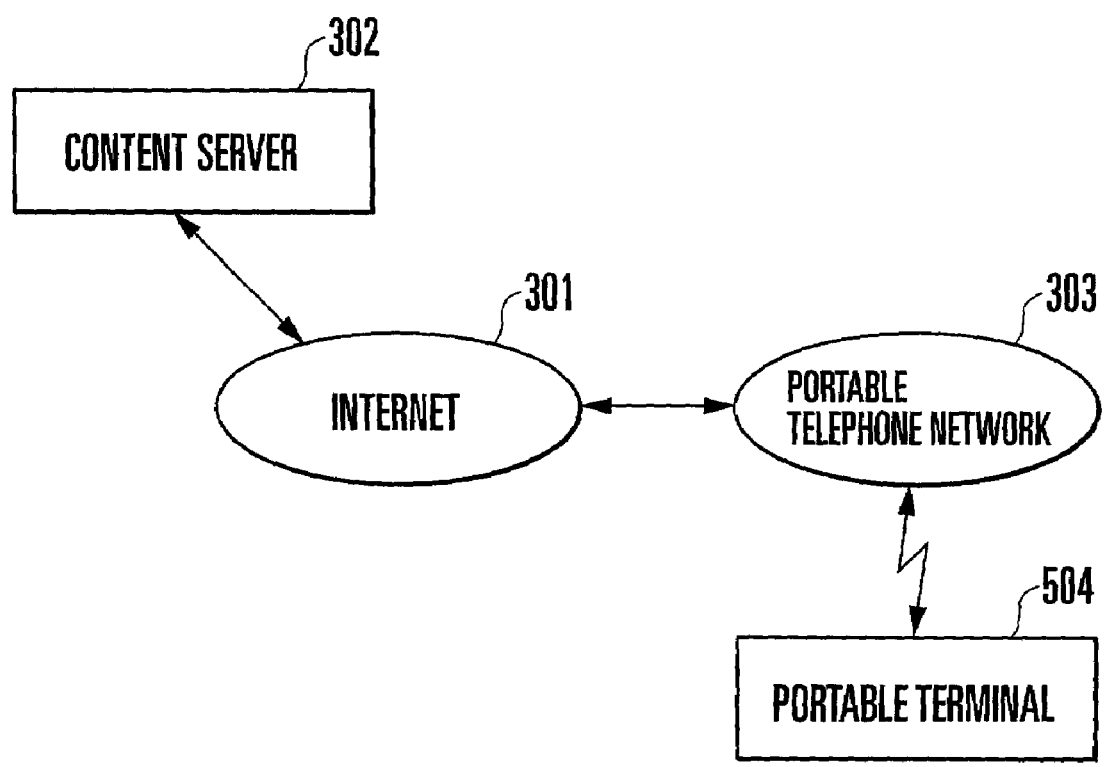
FIGS. 6A and 6B are a view showing the outline of an information processing system according to the second embodiment of the present invention and a block diagram of the portable terminal shown in FIG. 6A, respectively.

FIG. 6A shows the outline of an information processing system according to the second embodiment of the present invention. The same reference numerals as in the first embodiment denote the same parts in the second embodiment, and a detailed description thereof will be appropriately omitted. The information processing system of this embodiment has no external server terminal 305 (FIG. 1) connected to a portable terminal, unlike the first embodiment, and comprises the Internet 301, a content server 302 and portable telephone network 303 connected to the Internet 301, and a portable terminal 504 connected to the portable telephone network 303.

Figure 6B:
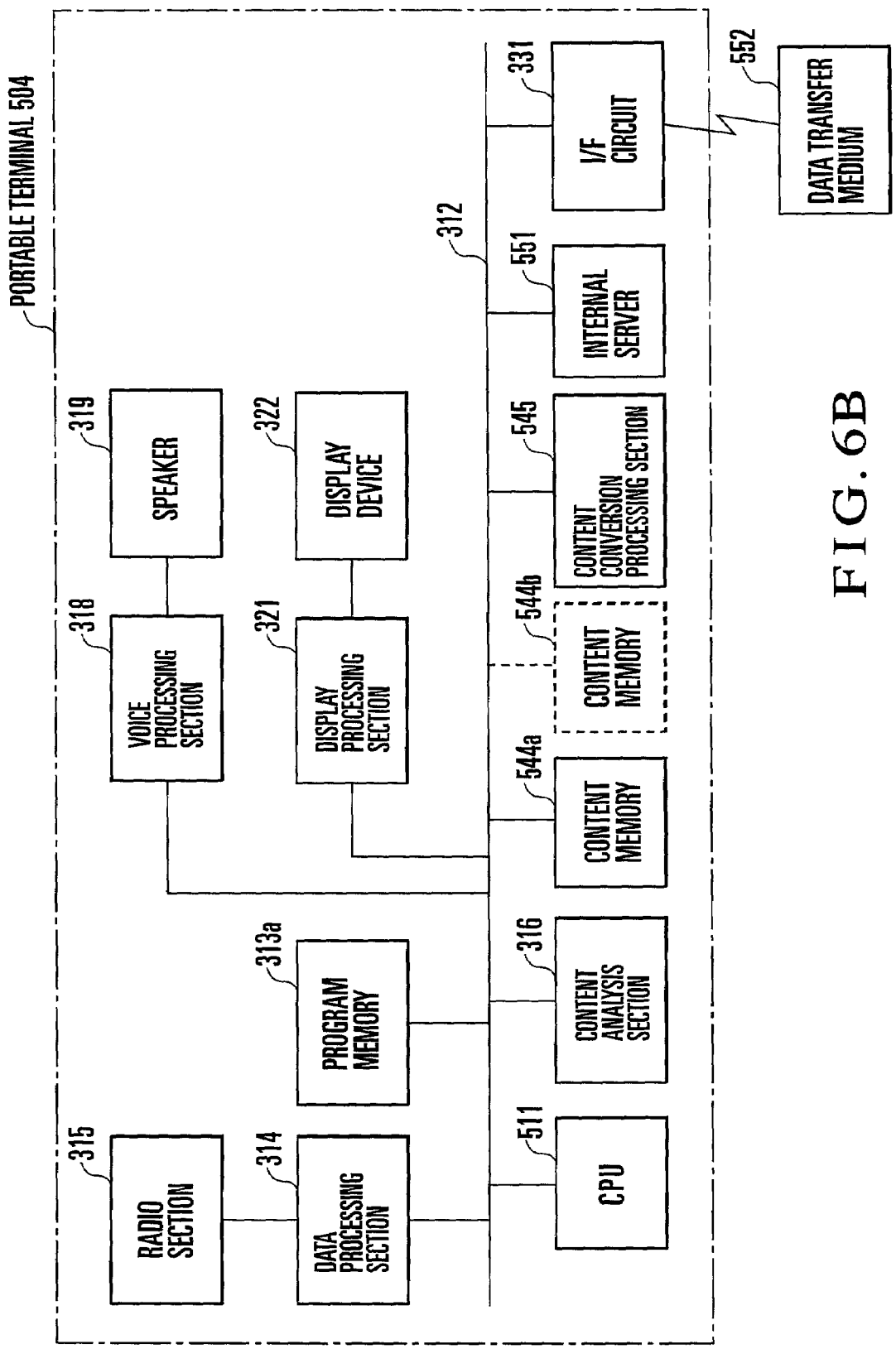

In this embodiment, the portable terminal 504 incorporates a content memory 544a and content conversion processing section 545 like the components arranged on the external server terminal side in the first embodiment, as shown in FIG. 6B. The portable terminal 504 also has a dedicated internal server 551 and acquires a content from the content server 302 (FIG. 1) through a data transfer medium 552 connected to an interface (I/F) circuit 331 using the internal server 551 in accordance with a program stored in a program memory 313a.

An example of the data transfer medium 552 is a computer connected to the content server 302 by radio or through a cable. That is, in this embodiment, under an environment where a memory with a relatively large capacity is incorporated in a compact electronic device, a large-capacity memory is arranged on the portable terminal 504 side as the content memory 544a, and a computer or a kind of information terminal is used as a medium for transferring data.

Since the portable terminal 504 has no external server terminal, unlike the first embodiment, a circuit corresponding to the interface circuit 332 (FIG. 2) is not arranged. The same functions as those of the external server terminal 305 are implemented by the content memory 544a, content conversion processing section 545, internal server 551, and data transfer medium 552, as will be described next.

Figure 7:
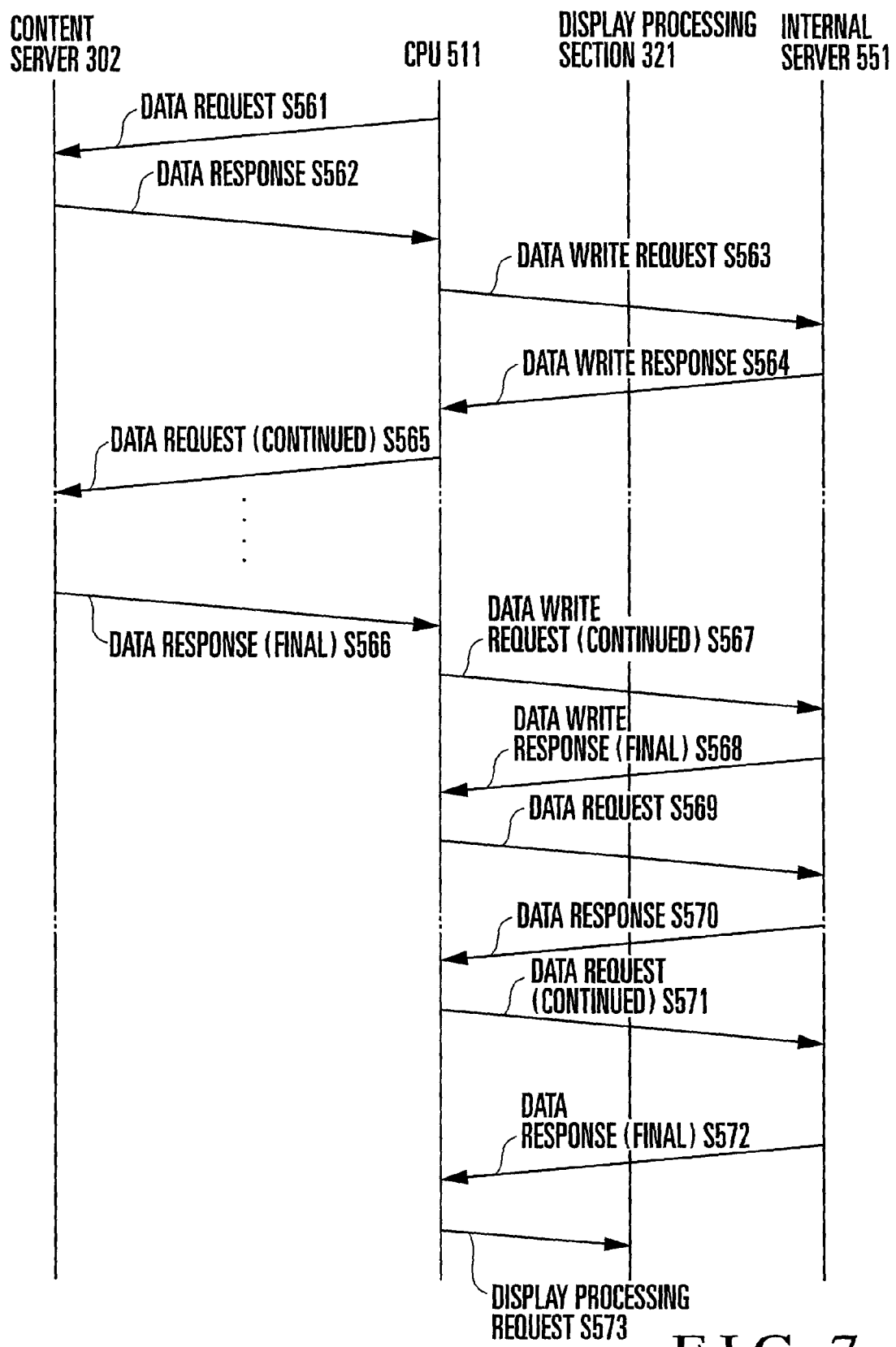
FIG. 7 is a flow chart showing processing when the portable terminal shown in FIGS. 6A and 6B requests a content server on a network to send a content.

Processing by the portable terminal 504 for requesting the content server on the network to send a content will be described next with reference to FIG. 7. First, a CPU 511 of the portable terminal 504 outputs a data request for content acquisition to the content server 302 (FIG. 1) (step S561). When the content server 302 returns a data response to the portable terminal 504 in response to the request (step S562), the portable terminal 504 analyzes the HTML of the received content. As a result of analysis, if the data amount is large, or data that cannot be directly reconstructed must be received, the portable terminal 504 requests the internal server 551 to write the data (step S563).

When the content of a homepage for a portable telephone, which has no problem for data reconstruction, is to be acquired, a display processing section 321 in the portable terminal 504 is immediately requested to execute display processing. Thus, the display data is displayed on a display device 322. Similarly, a voice processing section 318 is requested to execute processing, and the voice data is output from a speaker 319.

The internal server 551 which has received the data write request in step S563 analyzes the HTML of the content and then returns a data write response for the data write to the CPU 511 (step S564). On the basis of this, the CPU 511 sequentially requests the content server 302 to send data such as image data necessary for content reconstruction using the data transfer medium 552 (step S565). In response to this request, the content server 302 returns the data to the portable terminal 504 (step S566). The returned data is stored in the content memory 544a under the control of the internal server 551. The data request and data response are repeated until all the data necessary for reconstruction are received.

When the content server 302 transmits the final data in response to the data request (step S566), the CPU 511 requests the internal server 551 to write the data (step S567), and the internal server 551 responds to this final write request (step S568). Upon receiving a response representing that the final write is ended, the CPU 511 requests the internal server 551 to acquire the data (step S569). In response to this request, the internal server 551 reads out the data stored in the content memory 544a and sends the readout data to the content conversion processing section 545 so that the data is converted into data primitively processible in the portable terminal 504. After conversion, the content conversion processing section 545 sends the converted data to the CPU 511 (step S570).

The CPU 511 continues to sequentially execute the data request using the analysis result by the internal server 551 (step S571), while the internal server 551 sends the converted data to the CPU 511. When the final part of the converted data is sent from the internal server 551 to the CPU 511 (step S572), the internal server 551 recognizes that all the converted data are received and requests the display device 322 to display the data (step S573). Similarly, the voice processing section 318 is requested to output voice data from the speaker 319.

Note that the converted content may be temporarily stored in a content memory 544b, and the CPU 511 may execute display and voice output of the stored converted content. The content memories 544a and 544b may be formed by one memory.

Figure 8:
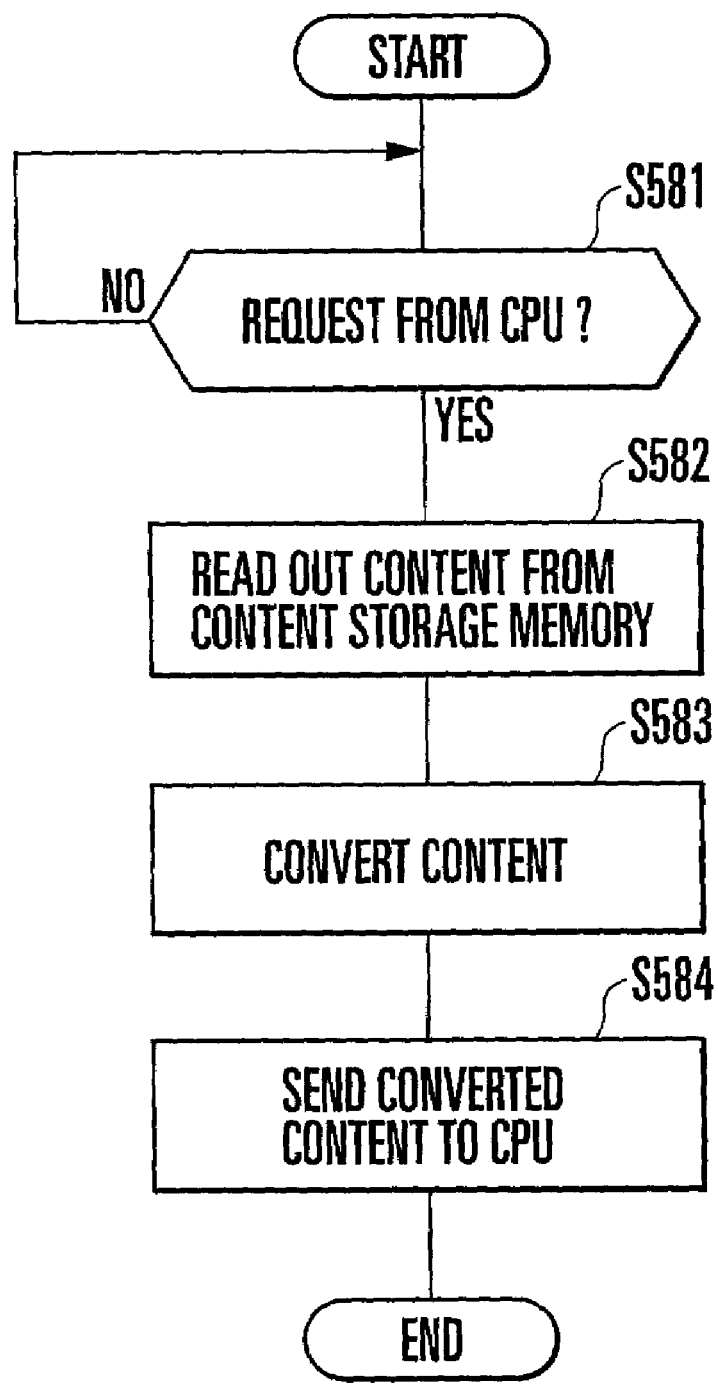
FIG. 8 is a flow chart showing content read and conversion processing by an internal server shown in FIG. 6B.

The content read and conversion processing by the internal server 551 will be described next with reference to FIG. 8. When data acquisition is requested in step S569 (FIG. 7) (YES in step S581), the internal server 551 reads out the data from the content memory 544a (step S582) and converts the content using the content conversion processing section 545 (step S583). After that, the internal server 551 sends the converted content to the CPU 511 (step S584). If the conversion request is divisionally done a plurality of number of times, after processing in step S584 is ended, the flow returns to processing in step S581 to wait for the request from the CPU 511. With this processing, the converted content can be acquired in accordance with progress of display.

Figure 9:
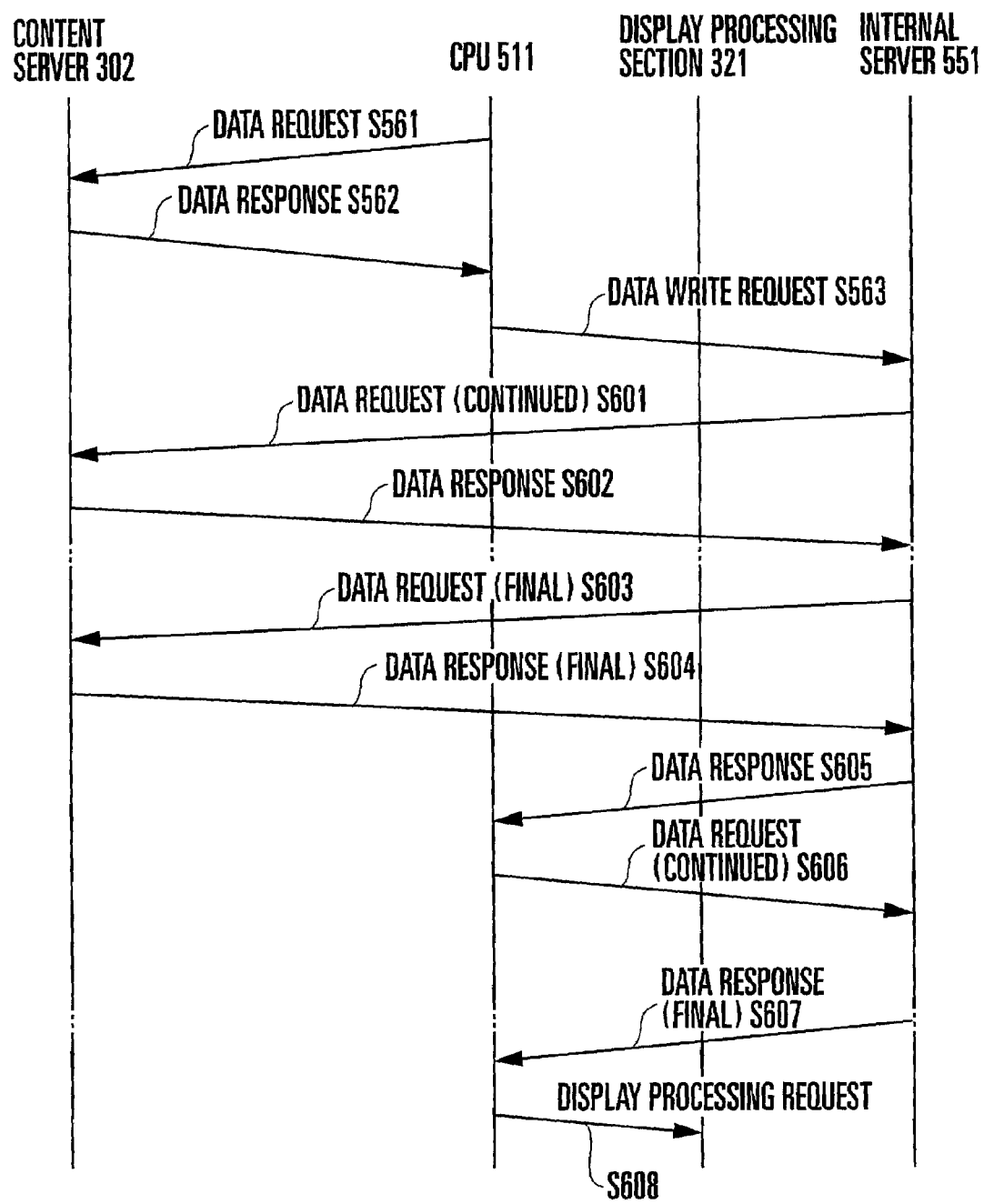
FIG. 9 is a flow chart showing processing when a portable terminal according to the third embodiment of the present invention requests a content server on a network to send a content.

FIG. 9 shows processing by a portable terminal according to the third embodiment of the present invention. The same reference numerals as in FIG. 7 denote the same parts in FIG. 9, and a detailed description thereof will be appropriately omitted. This embodiment has the same hardware configuration as that shown in FIGS. 6A and 6B.

When a content server 302 returns a data response to a portable terminal 504 in step S562, a CPU 511 requests an internal server 551 to write the data (step S563). After that, the internal server 551 is not directly involved in the content acquisition from the content server 302. More specifically, upon receiving the data write request from the CPU 511, the internal server 551 directly requests the content server 302 to send the data (step S601). In response to this request, the content server 302 directly transmits the data to the internal server 551 without intervening the CPU 511 (step S602).

After that, when the final request related to the predetermined content is sent from the internal server 551 (step S603), and the content server 302 sends the final data in response to this request (step S604), the internal server 551 notifies the CPU 511 that all the data related to the desired content are received (step S605). The CPU 511 recognizes that the contents of the content are completely stored in a content memory 544. Next, the CPU 511 sends to the internal server 551 a data request for converting and acquiring the content stored in the content memory 544 (step S606). In response to this request, the internal server 551 executes a data read and content conversion processing one or a plurality of number of times. When the final converted data is sent to the CPU 511 (step S607), the CPU 511 requests a display processing section 321 to execute display processing for displaying data on a display device 322 (step S608). Similarly, a voice processing section 318 is requested to output voice data from a speaker 319.

In this embodiment, the internal server 551 is arranged in the portable terminal 504. However, even when the portable terminal and server are connected through a channel, as in the first embodiment, a content can be acquired in accordance with the same procedure as described above as long as the server can be independently connected to the content server 302. In the first embodiment, a notebook computer can be connected to the content server 302 by a means such as radio or LAN (Local Area Network), so the same control as described above can be performed.

Figure 10:
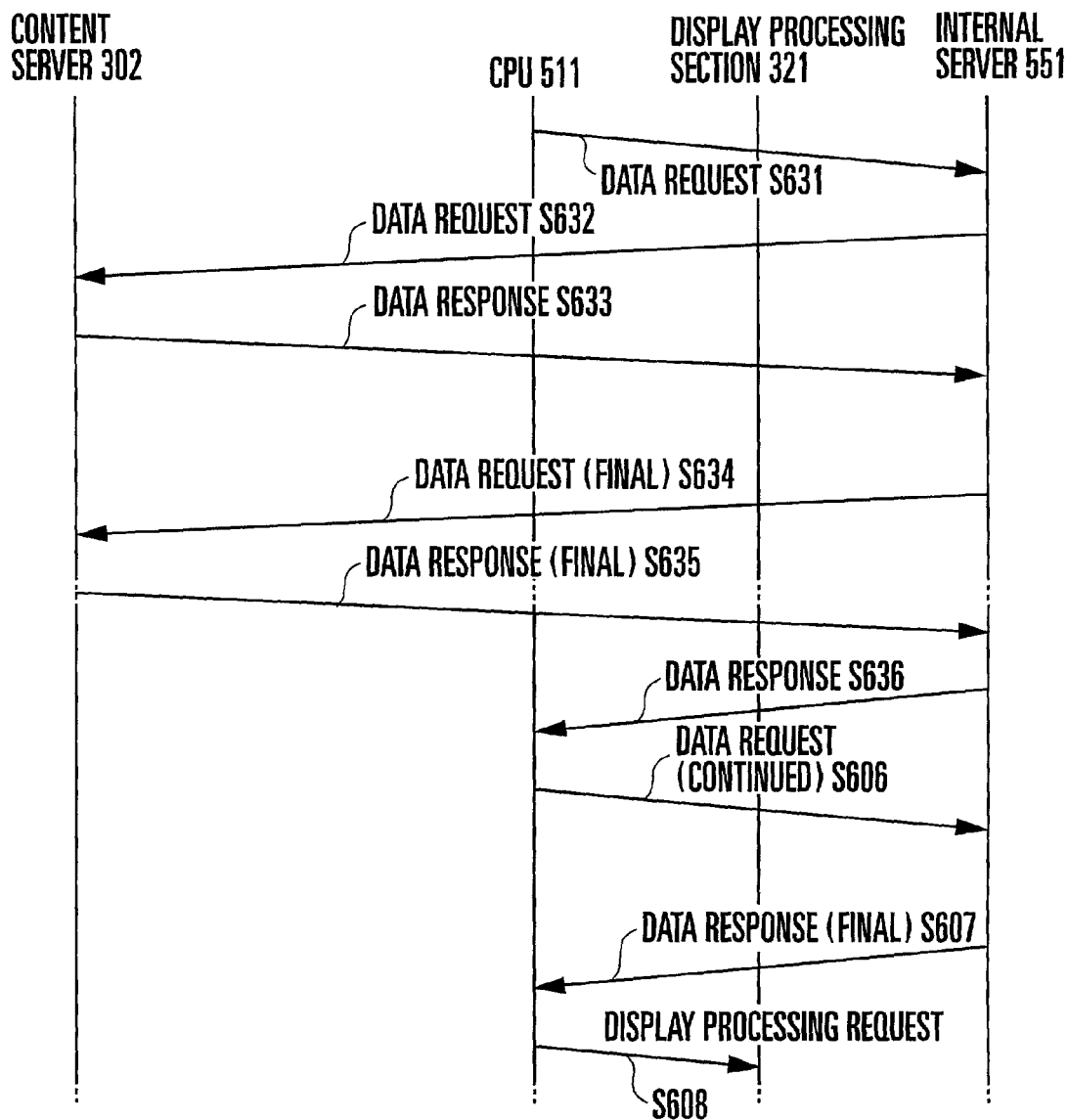
FIG. 10 is a flow chart showing processing when a portable terminal according to the fourth embodiment of the present invention requests a content server on a network to send a content.

The processing operation of a portable terminal according to the fourth embodiment of the present invention will be described next with reference to FIG. 10. The same reference numerals as in FIG. 7 denote the same parts in FIG. 10, and a detailed description thereof will be appropriately omitted. This embodiment has the same hardware configuration as that shown in FIGS. 6A and 6B.

Upon receiving a content acquisition request, a CPU 511 requests not a content server 302 but an internal server 551 for the content (step S631). After that, the internal server 551 directly requests the content server 302 to acquire the content (step S632) and the content server 302 directly sends the requested content to the internal server 551 (step S633).

After the data is exchanged a predetermined number of times in this way, the internal server 551 sends the final data request to the content server 302 on the basis of the HTML analysis result (step S634). In response to this request, the content server 302 transmits the data to the internal server 551 (step S635), and the internal server 551 notifies the CPU 511 that the data is received in response to the data request in step S631 (step S636). The subsequent processing is the same as that in steps S606 to S608 (FIG. 9) in the third embodiment. That is, the CPU 511 requests to convert the content and sequentially acquire the converted content, thereby executing display on a display device 322 or voice output from a speaker 319.

The display window of a portable terminal according to the fifth embodiment of the present invention will be described next with reference to FIG. 11. In the above embodiments, the portable terminal can indirectly grasp raw data sent from the content server. In the first embodiment, since such data is stored in a notebook computer (external server terminal 305), the contents can be sufficiently examined using the external server terminal 305. A user who is going out and cannot use a wired communication means often wants to acquire several contents using the portable terminal and quickly check only immediately necessary information on the portable terminal.

Figure 11:
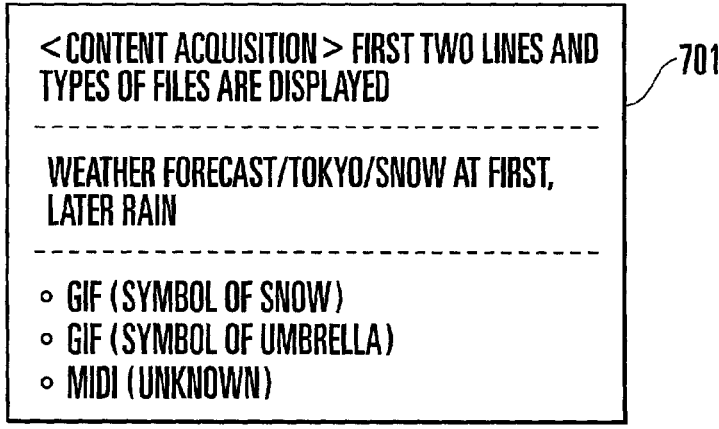
FIG. 11 is a plan view of the display window of a portable terminal according to the fifth embodiment of the present invention.

As shown in FIG. 11, the first two lines of text of a content sent to the external server terminal 305 (FIG. 1) and the types of various files of the content are displayed in a display window 701 of a portable terminal. If the files have file names that often represent the contents thereof, the file names may be displayed.

Hence, the holder of a portable terminal 304 who requests content acquisition can check the outline of a content while various data of the content are being downloaded from a content server 302. For example, only text information can be acquired from the external server terminal 305, or only a necessary file can be acquired after conversion. Any other data can be reconstructed under an environment where the notebook computer (external server terminal 305) can be freely used.

In this embodiment, partial check of text information has been described. In some cases, a plurality of music data are downloaded from a site that handles music information. At this time, the start portion of music data may be immediately converted by the receiving server, and the converted start portion of the music data may be transmitted to the portable terminal 304 or 504. In this case, the holder of the portable terminal 304 or 504 requests only immediately necessary music data again, thereby converting the data and listening to complete music data.

Processing by a portable terminal according to the sixth embodiment of the present invention will be described next with reference to FIG. 12. This embodiment has the same hardware configuration as that shown in FIGS. 1 and 2.

A CPU 311 (FIG. 2) of a portable terminal 304 monitors generation of a content acquisition request (step S801). When a content acquisition request is generated, the portable terminal 304 requests a content server 302 to send the content (step S802). Upon receiving the HTML document of the content from the content server 302 responding to the request (YES in step S803), the portable terminal 304 determines whether all the contents of the content can be reconstructed by itself (step S804).

If at least part of the contents cannot be reconstructed because, e.g., a plug-in that is absent in the portable terminal 304 is requested, or a file other except predetermined file formats is used, the CPU 311 sends the received HTML document to an external server terminal 305 and requests it to execute the subsequent content acquisition procedure for the content server 302. After that, when a content acquisition completion notification is received from the content server 302, a converted content is requested, and the content is reconstructed using the converted content (step S805).

If YES in step S804, various remaining files of the content are received by the portable terminal 304 and reconstructed without intervening the external server terminal 305 (step S806).

Figure 13:
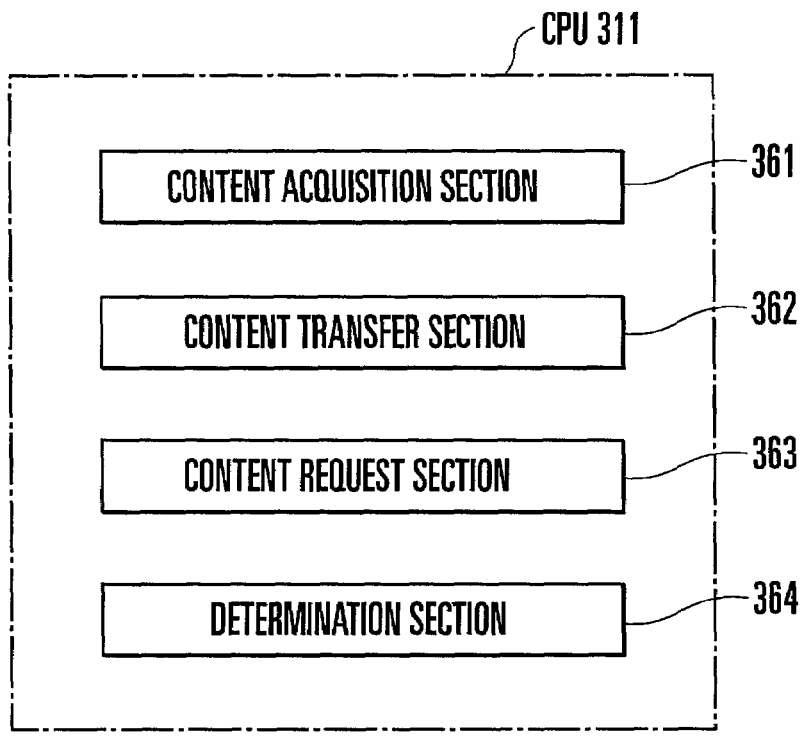
FIG. 13 is a functional block diagram of the CPU of the portable terminal shown in FIG. 2.
Figure 14:
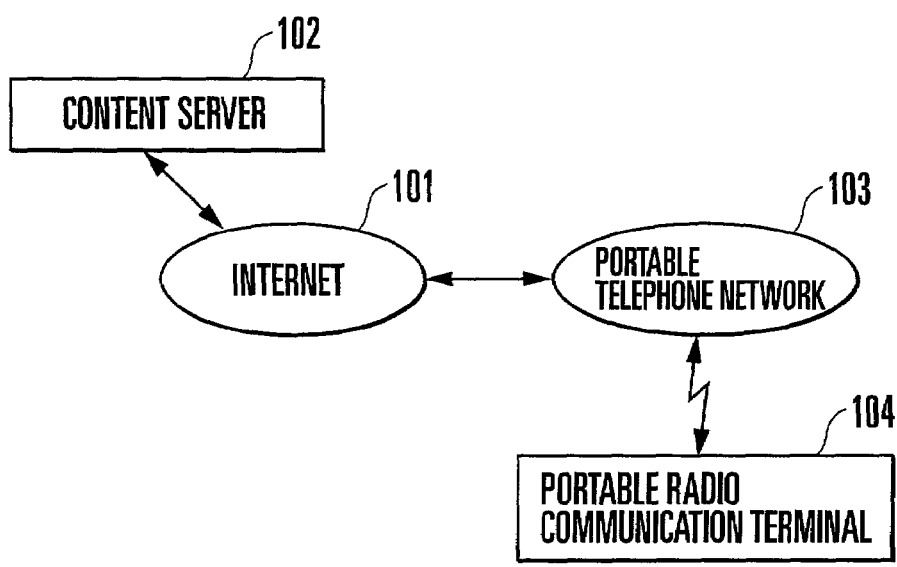
FIG. 14 is a view showing the outline of a conventional information processing system using a portable terminal.
Figure 16:
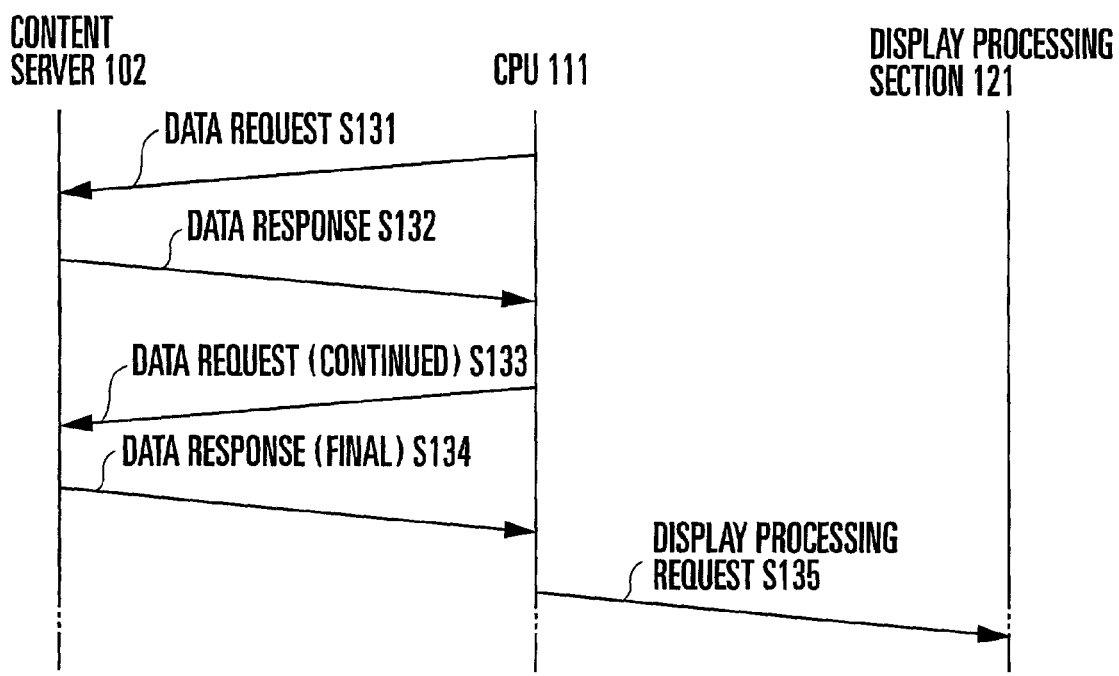
FIG. 16 is a flow chart showing processing from a content request from the portable terminal shown in FIGS. 14 and 15 to image display.

FIG. 13 shows the CPU 311 of the portable terminal 304 according to the first and sixth embodiments. The CPU 311 comprises a content acquisition section 361 for acquiring a content through the Internet 301, a content transfer section 362 for transferring the content acquired by the content acquisition section 361 to the external server terminal 305, a content request section 363 for requesting the external server terminal 305 to transmit converted content data, and a determination section 364 for determining whether the acquired content can be output on the portable terminal side without any conversion.

Figure 12:
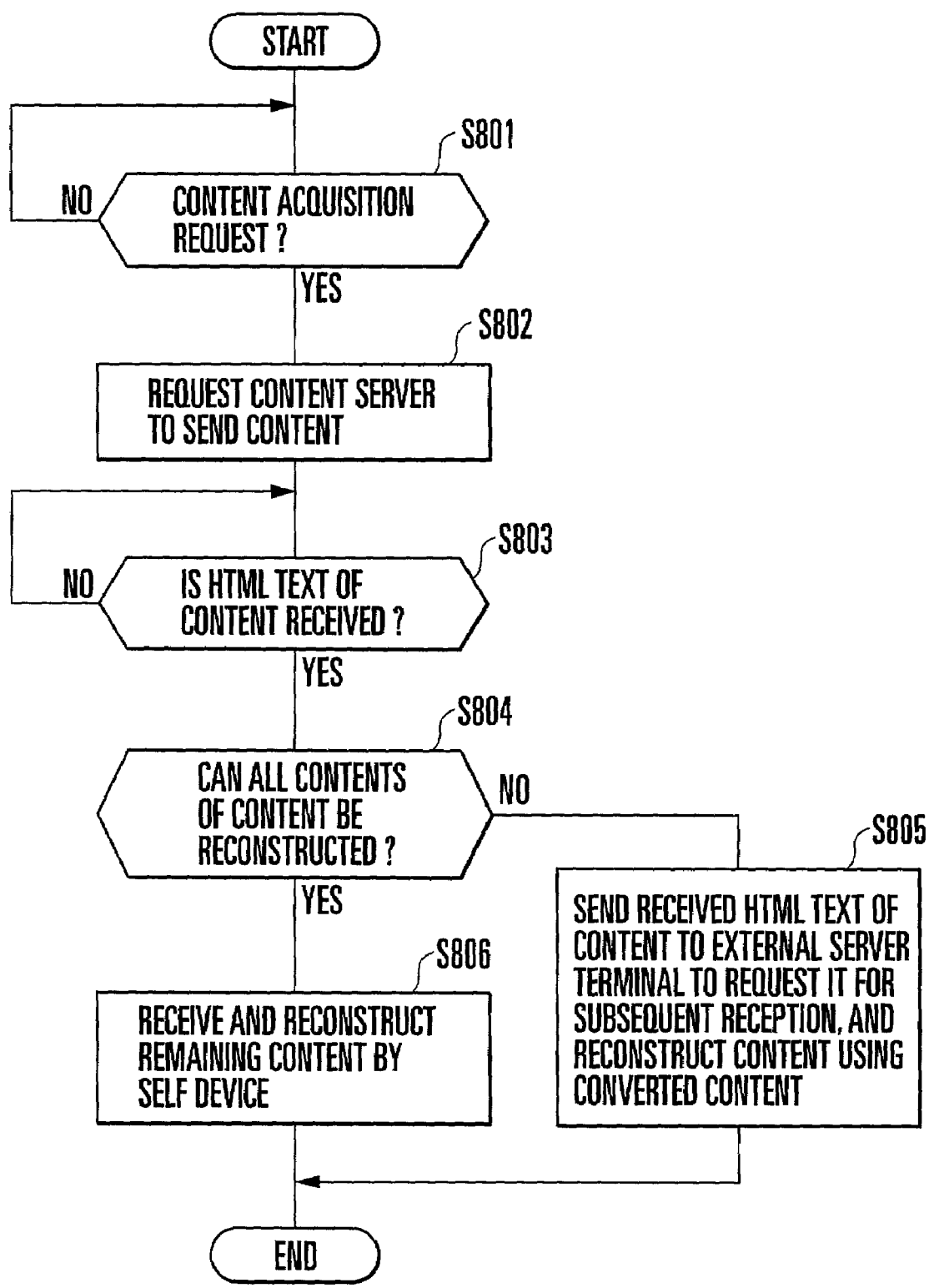
FIG. 12 is a flow chart showing processing by a portable terminal according to the sixth embodiment of the present invention.

The content acquisition section 361 executes steps S401 and S402 in FIG. 3, the content transfer section 362 executes steps S403 and S404 in FIG. 2, the content request section 363 executes step S405 in FIG. 2, and the determination section 364 executes step S804 in FIG. 12.

In the above embodiments, a notebook computer is used as an external server. However, any other information processing device which has a memory with a relatively large capacity and can communicate with a portable terminal through a cable or by radio can be used as an external server or attached server. Such an external/proxy server need not be arranged in a one-to-one correspondence with a radio terminal, and a single external/proxy server may correspond to a plurality of radio terminals. In this case, a content acquired by one radio terminal can be shared by plurality of radio terminals by, e.g., re-conversion of the content. The external server or proxy server itself can also independently reconstruct the content.

In the second to sixth embodiments as well, the gateways $205_1$ to $205_D$ (FIG. 17) are not present between the content server 302 and the means for acquiring a content, as in the first embodiment. Hence, the problem of security pointed out as the prior art is not posed. In addition, the server has a specific relationship to the portable terminal because, e.g., the server is present in the portable terminal. This also obviously avoids the problem of security, so a system excellent in security can be built.

As has been described above, according to the present invention, a content acquired through the Internet is transferred from a portable terminal to a content server, and the content data converted in accordance with the content reconstruction capability of the portable terminal is acquired from the server. For this reason, even when the data amount of the content is large, no overload is imposed on the memory of the portable terminal, and the memory can be used systematically. Hence, the cost of the portable terminal can be reduced. In addition, the portable terminal can cope with an advanced expression format of a content. Furthermore, contents stored on the server side can be used by the server itself or another device.

Since the storage means for storing the acquired content is arranged in the radio terminal itself, the radio terminal itself can function as a server for distributing the data to another device as the large-capacity memory becomes compact. That is, when a storage means for storing a content acquired from the content server in an unchanged format is prepared, the content can be effectively used.

Since an information processing system is constituted by a radio terminal and an attached server attached to the radio terminal, the information processing system can sufficiently cope with a change in technical environment without any large modification on the radio terminal side.

Since acquired contents are stored on the server side, any wasteful access to the content server can be omitted. In addition, the contents can be used by sharing them. In addition, the system can cope with various communication methods.

Since the radio terminal can reconstruct not only converted content data but also a content that can be directly reconstructed, the radio terminal can take a mode corresponding to the contents of a content.

The radio terminal checks whether a content has contents directly reconstructable in the radio terminal. Hence, if an acquired content can be directly reconstructed, the content can be directly reconstructed without acquiring converted content.

At least part of the contents of a content, which can be reconstructed by the radio terminal, can be reconstructed in advance. Hence, the time until reconstruction can be shortened, and an optimum content reconstruction means, including the server, can be determined on the radio terminal side.

Since the external processing terminal receives a content transferred from the radio terminal as a content acquisition destination, converts the content in accordance with a request from the radio terminal, and returns the content, a content that cannot be reconstructed by the radio terminal can be reconstructed. Hence, the capability of the radio terminal can be indirectly increased and utilized.

When a content reconstruction means for directly reconstructing a content received by the external processing terminal is prepared, the external processing terminal itself can also reconstruct the content, so the occasion for reconstruction can be extended. In addition, if the external processing terminal itself has a high reconstruction capability, the quality of reconstruction improves as compared to that at the content acquisition destination.

When a content transferred from the radio terminal is stored in the external processing terminal, and the content is requested by a device other than the content acquisition destination, the content can be converted and transmitted to the requesting device. Thus, a content acquired by the content acquisition destination can be used by a plurality of devices, so the content can be effectively used.

What is claimed is:

1. A radio terminal comprising:
   content acquisition means for acquiring a content on the Internet by radio;
   determination means for determining whether the radio terminal can reconstruct the content acquired by the content acquisition means without any conversion;
   content transfer means for transferring the content acquired by the content acquisition means to an external server;
   content request means for, after transfer of the content, requesting the external server to transmit content data converted into a data format that the radio terminal can reconstruct;
   a memory which stores converted content data received from the external server in response to a request from the content request means; and
   content reconstruction means for reconstructing the converted content data stored in the memory and for directly reconstructing at least part of the content acquired by the content acquisition means before receiving the converted content from the external server.

2. The terminal according to claim 1, wherein the content acquisition means requests the external server to acquire the content, and the external server requests and acquires the content from the Internet in response to the content acquisition request.

3. An information processing system, comprising:
   (A) a radio terminal connected to the Internet by radio and comprising:
       (1) content acquisition means for acquiring a content on the Internet by radio;
       (2) determination means for determining whether the radio terminal can directly reconstruct the acquired content without any conversion,
       (3) content transfer means for transferring the content acquired by the content acquisition means to an external server;
       (4) content request means for requesting the external server to transmit a content in a data format that the radio terminal can reconstruct;
       (5) content reconstruction means for reconstructing the content data received from the external server and for directly reconstructing at least part of the content acquired by the content acquisition means before receiving the converted content from the external server; and (B) the external server in communication with the radio terminal and comprising:
   (1) a memory which stores the content transferred from the radio terminal by the content transfer means;
   (2) content conversion means for converting the content stored in the content storage means into content data based on the request from the content request means; and
   (3) content transmission means for transmitting the content data converted by the content conversion means to the radio terminal in response to the request from the content request means.

4. The system according to claim 3, wherein the content acquisition means comprises:
   an internal server for sending/receiving a data request and response to/from the Internet; and
   a data transfer medium for receiving the content from the Internet by controlling the internal server.

5. The system according to claim 4, wherein
   the content acquisition means sends a content acquisition request to the external server, and
   the external server performs data transmission/reception operation for content acquisition to/from the Internet through the radio terminal in response to the content acquisition request.

6. A method of browsing content comprising a web page and associated contents from a content server on the Internet using a cellular telephone, the method comprising:
   requesting content from the content server through radio communications;
   receiving the content through radio communications;
   determining whether the received content is in a data format that the telephone can reconstruct;
   reconstructing the so formatted content;
   transferring the content received to an external server;
   the external server converting the transferred content into a data format that the telephone can reconstruct;
   requesting that the external server transmit the so converted content data; and
   reconstructing the so converted content data;
   wherein the so formatted content is reconstructed before reconstructing the so converted content data.

7. The method of claim 6, further comprising:
   reconstructing the so formatted content before transferring content not in such format to the external server.

8. The method of claim 6, wherein the telephone requests the content from the content server, but the content is received by the external server.

9. The method of claim 6, wherein the telephone requests the content from the external server, and the method further comprises the external server requesting the content from the content server through the telephone.

* * * * *